US008087060B2

(12) United States Patent
Norman et al.

(10) Patent No.: US 8,087,060 B2
(45) Date of Patent: Dec. 27, 2011

(54) CHAINING INFORMATION CARD SELECTORS

(76) Inventors: James Mark Norman, Pleasant Grove, UT (US); Daniel S. Sanders, Orem, UT (US)

( * ) Notice: Subject to any disclaimer, the term of this patent is extended or adjusted under 35 U.S.C. 154(b) by 886 days.

(21) Appl. No.: 11/843,608

(22) Filed: Aug. 22, 2007

(65) Prior Publication Data

US 2008/0229411 A1 Sep. 18, 2008

Related U.S. Application Data

(60) Provisional application No. 60/895,312, filed on Mar. 16, 2007, provisional application No. 60/895,316, filed on Mar. 16, 2007, provisional application No. 60/895,325, filed on Mar. 16, 2007.

(51) Int. Cl.
*G06F 21/00* (2006.01)
*H04L 29/06* (2006.01)

(52) U.S. Cl. ............... 726/1; 726/9; 726/20; 705/65

(58) Field of Classification Search .................. None
See application file for complete search history.

(56) References Cited

U.S. PATENT DOCUMENTS

| 3,614,839 | A | 10/1971 | Thomas |
| 3,949,501 | A | 4/1976 | Andrews et al. |
| 4,153,931 | A | 5/1979 | Green et al. |
| 4,568,403 | A | 2/1986 | Egan |
| 4,730,848 | A | 3/1988 | McCormick |
| 5,073,950 | A | 12/1991 | Colbert et al. |
| 5,485,510 | A | 1/1996 | Colbert |
| 5,546,471 | A | 8/1996 | Merjanian |
| 5,546,523 | A | 8/1996 | Gatto |
| 5,594,806 | A | 1/1997 | Colbert |
| 5,613,012 | A | 3/1997 | Hoffman et al. |
| 5,848,412 | A | 12/1998 | Rowland et al. |
| 6,028,950 | A | 2/2000 | Merjanian |
| 6,055,595 | A | 4/2000 | Tachibana et al. |
| 6,327,578 | B1 | 12/2001 | Linehan |
| 6,363,488 | B1 | 3/2002 | Ginter et al. |
| 6,481,621 | B1 | 11/2002 | Herrendoerfer et al. |
| 6,513,721 | B1 | 2/2003 | Salmre et al. |
| 6,612,488 | B2 | 9/2003 | Suzuki |

(Continued)

FOREIGN PATENT DOCUMENTS

EP 0917120 5/1999

(Continued)

OTHER PUBLICATIONS

Computer Security Institute; "What InfoCard Is and Isn't"; http://web.archive.org.web/20060423133 805/http:/www.identityblog.com/wp-content/resources/alert.pdf, May 2006 (4 pages).

(Continued)

*Primary Examiner* — Christopher Revak
(74) *Attorney, Agent, or Firm* — Marger Johnson & McCollom PC

(57) ABSTRACT

A machine includes card stores to store information cards. For each card store, one or more card selectors can be provided. When performing a transaction involving information cards, a generic card selector, using a selector policy engine, can identify a card selector to use for the transaction. The identified card selector can be used to identify an information card in a card store to use in performing the transaction, which can be used to provide a security token to the relying party.

20 Claims, 7 Drawing Sheets

U.S. PATENT DOCUMENTS

| | | |
|---|---|---|
| 6,721,713 B1 | 4/2004 | Guheen et al. |
| 6,880,155 B2 | 4/2005 | Schwabe et al. |
| 6,913,194 B2 | 7/2005 | Suzuki |
| 6,970,836 B1 | 11/2005 | Paltenghe et al. |
| 7,003,501 B2 | 2/2006 | Ostroff |
| 7,103,575 B1 | 9/2006 | Linehan |
| 7,104,444 B2 | 9/2006 | Suzuki |
| 7,210,620 B2 | 5/2007 | Jones |
| 7,225,156 B2 | 5/2007 | Fisher et al. |
| 7,231,369 B2 | 6/2007 | Hirabayashi |
| 7,343,351 B1 | 3/2008 | Bishop et al. |
| 7,353,532 B2 * | 4/2008 | Duri et al. .................. 726/1 |
| 7,360,237 B2 | 4/2008 | Engle et al. |
| 7,416,486 B2 * | 8/2008 | Walker et al. ............... 463/25 |
| 7,444,519 B2 | 10/2008 | Laferriere et al. |
| 7,487,920 B2 * | 2/2009 | Sato et al. .................. 235/492 |
| 7,494,416 B2 * | 2/2009 | Walker et al. ............... 463/25 |
| 7,500,607 B2 | 3/2009 | Williams |
| 7,529,698 B2 | 5/2009 | Joao |
| 7,537,152 B2 | 5/2009 | Chakiris et al. |
| RE40,753 E | 6/2009 | Wang et al. |
| 7,555,460 B1 | 6/2009 | Barkan |
| 7,565,329 B2 | 7/2009 | Lapsley et al. |
| 7,591,424 B2 | 9/2009 | Wang et al. |
| 7,594,258 B2 * | 9/2009 | Mao et al. .................. 726/9 |
| 7,610,040 B2 | 10/2009 | Cantini et al. |
| 7,613,659 B1 | 11/2009 | Hoffman et al. |
| 7,620,177 B2 | 11/2009 | Ibrahim et al. |
| 7,636,941 B2 | 12/2009 | Blinn et al. |
| 7,661,585 B2 | 2/2010 | Joao |
| 7,664,022 B2 | 2/2010 | Hu |
| 7,747,540 B2 | 6/2010 | Cameron et al. |
| 7,771,273 B2 * | 8/2010 | Walker et al. ............... 463/25 |
| 7,788,499 B2 * | 8/2010 | Cameron et al. ............. 713/185 |
| 7,797,413 B2 | 9/2010 | Adelman et al. |
| 7,797,434 B2 | 9/2010 | Blakley et al. |
| 7,831,522 B1 | 11/2010 | Satish et al. |
| 7,860,883 B2 | 12/2010 | Hinton et al. |
| 2001/0007983 A1 | 7/2001 | Lee |
| 2002/0026397 A1 | 2/2002 | Ieta et al. |
| 2002/0029337 A1 | 3/2002 | Sudia et al. |
| 2002/0029342 A1 | 3/2002 | Keech |
| 2002/0046041 A1 | 4/2002 | Lang |
| 2002/0083014 A1 | 6/2002 | Brickell et al. |
| 2002/0095360 A1 | 7/2002 | Joao |
| 2002/0103801 A1 | 8/2002 | Lyons |
| 2002/0116647 A1 | 8/2002 | Mont et al. |
| 2002/0178370 A1 | 11/2002 | Gurevich et al. |
| 2003/0061170 A1 | 3/2003 | Uzo |
| 2003/0126094 A1 | 7/2003 | Fisher et al. |
| 2003/0158960 A1 | 8/2003 | Engberg |
| 2003/0172090 A1 | 9/2003 | Asunmaa et al. |
| 2003/0217140 A1 | 11/2003 | Burbeck et al. |
| 2003/0218062 A1 | 11/2003 | Noriega et al. |
| 2004/0019571 A1 | 1/2004 | Hurwitz et al. |
| 2004/0034440 A1 | 2/2004 | Middlebrook |
| 2004/0128392 A1 | 7/2004 | Blakley et al. |
| 2004/0162786 A1 | 8/2004 | Cross et al. |
| 2004/0199475 A1 | 10/2004 | Rivest et al. |
| 2004/0199787 A1 | 10/2004 | Hans et al. |
| 2004/0230831 A1 | 11/2004 | Spelman et al. |
| 2005/0027713 A1 | 2/2005 | Cameron et al. |
| 2005/0033692 A1 | 2/2005 | Jarman et al. |
| 2005/0044423 A1 | 2/2005 | Mellmer et al. |
| 2005/0091543 A1 | 4/2005 | Holtzman et al. |
| 2005/0097550 A1 | 5/2005 | Schwabe et al. |
| 2005/0124320 A1 | 6/2005 | Ernst et al. |
| 2005/0135240 A1 | 6/2005 | Ozugur |
| 2005/0229005 A1 | 10/2005 | Le Saint et al. |
| 2005/0247777 A1 | 11/2005 | Pitroda |
| 2005/0247797 A1 | 11/2005 | Ramachandran |
| 2005/0289080 A1 | 12/2005 | Rhiando |
| 2005/0289341 A1 | 12/2005 | Ritola et al. |
| 2006/0020679 A1 | 1/2006 | Hinton et al. |
| 2006/0136990 A1 | 6/2006 | Hinton et al. |
| 2006/0155993 A1 | 7/2006 | Busboon |
| 2006/0200424 A1 | 9/2006 | Cameron et al. |
| 2006/0206931 A1 | 9/2006 | Dillaway et al. |
| 2006/0224611 A1 | 10/2006 | Dunn et al. |
| 2006/0235796 A1 | 10/2006 | Johnson et al. |
| 2007/0016484 A1 | 1/2007 | Waters et al. |
| 2007/0016943 A1 | 1/2007 | M'Raihi et al. |
| 2007/0043651 A1 | 2/2007 | Xiao et al. |
| 2007/0061567 A1 | 3/2007 | Day et al. |
| 2007/0118449 A1 | 5/2007 | De La Motte |
| 2007/0143835 A1 | 6/2007 | Cameron et al. |
| 2007/0192245 A1 | 8/2007 | Fisher et al. |
| 2007/0203852 A1 | 8/2007 | Cameron et al. |
| 2007/0204168 A1 | 8/2007 | Cameron et al. |
| 2007/0204325 A1 * | 8/2007 | Cameron et al. ................. 726/1 |
| 2007/0208869 A1 | 9/2007 | Adelman et al. |
| 2007/0208940 A1 | 9/2007 | Adelman et al. |
| 2007/0214079 A1 | 9/2007 | Mears |
| 2007/0214429 A1 | 9/2007 | Lyudovyk et al. |
| 2007/0282951 A1 | 12/2007 | Selimis et al. |
| 2007/0294431 A1 | 12/2007 | Adelman et al. |
| 2008/0003977 A1 | 1/2008 | Chakiris et al. |
| 2008/0010675 A1 | 1/2008 | Massascusa et al. |
| 2008/0071808 A1 | 3/2008 | Hardt et al. |
| 2008/0098228 A1 | 4/2008 | Anderson et al. |
| 2008/0140576 A1 | 6/2008 | Lewis et al. |
| 2008/0141339 A1 | 6/2008 | Gomez et al. |
| 2008/0141366 A1 | 6/2008 | Cross et al. |
| 2008/0162297 A1 | 7/2008 | Hershkovitz et al. |
| 2008/0178271 A1 * | 7/2008 | Gajjala et al. .................. 726/6 |
| 2008/0178272 A1 * | 7/2008 | Gajjala et al. .................. 726/6 |
| 2008/0184339 A1 | 7/2008 | Shewchuk et al. |
| 2008/0189778 A1 | 8/2008 | Rowley |
| 2008/0196096 A1 | 8/2008 | Grynberg |
| 2008/0222714 A1 | 9/2008 | Wahl |
| 2008/0229410 A1 | 9/2008 | Felsted et al. |
| 2008/0235144 A1 | 9/2008 | Phillips |
| 2008/0244722 A1 | 10/2008 | Satish et al. |
| 2008/0256594 A1 | 10/2008 | Satish et al. |
| 2008/0263644 A1 | 10/2008 | Grinstein |
| 2008/0289020 A1 | 11/2008 | Cameron et al. |
| 2008/0301784 A1 | 12/2008 | Zhu et al. |
| 2008/0313567 A1 | 12/2008 | Sabin et al. |
| 2009/0013391 A1 | 1/2009 | Ernst |
| 2009/0037920 A1 | 2/2009 | Brown et al. |
| 2009/0077118 A1 | 3/2009 | Doman et al. |
| 2009/0077627 A1 * | 3/2009 | Doman et al. .................. 726/1 |
| 2009/0089625 A1 | 4/2009 | Kannappan et al. |
| 2009/0089870 A1 | 4/2009 | Wahl |
| 2009/0089871 A1 | 4/2009 | Murphy et al. |
| 2009/0099860 A1 | 4/2009 | Karabulut et al. |
| 2009/0125558 A1 * | 5/2009 | Suh .................. 707/104.1 |
| 2009/0131157 A1 | 5/2009 | Hedrick et al. |
| 2009/0138398 A1 | 5/2009 | Cole et al. |
| 2009/0178112 A1 | 7/2009 | Doman et al. |
| 2009/0186701 A1 | 7/2009 | Rowe et al. |
| 2009/0199284 A1 | 8/2009 | Sanders et al. |
| 2009/0204622 A1 * | 8/2009 | Sanders et al. ................. 707/100 |
| 2009/0205014 A1 | 8/2009 | Doman et al. |
| 2009/0205035 A1 * | 8/2009 | Sermersheim et al. ........... 726/9 |
| 2009/0216666 A1 | 8/2009 | Antao et al. |
| 2009/0241178 A1 * | 9/2009 | Burch et al. ...................... 726/9 |
| 2009/0249430 A1 | 10/2009 | Buss et al. |
| 2009/0251749 A1 | 10/2009 | O'Boyle et al. |
| 2009/0254476 A1 * | 10/2009 | Sharma et al. .................. 705/39 |
| 2009/0254483 A1 | 10/2009 | Barkan |
| 2009/0260064 A1 | 10/2009 | McDowell et al. |
| 2009/0300512 A1 | 12/2009 | Ahn |
| 2009/0300714 A1 | 12/2009 | Ahn |
| 2009/0300747 A1 | 12/2009 | Ahn |
| 2009/0320095 A1 | 12/2009 | Nanda et al. |
| 2009/0328166 A1 | 12/2009 | Burch et al. |
| 2010/0037303 A1 | 2/2010 | Sharif et al. |
| 2010/0274691 A1 | 10/2010 | Hammad et al. |
| 2011/0023103 A1 | 1/2011 | Dietrich et al. |

FOREIGN PATENT DOCUMENTS

| | | |
|---|---|---|
| JP | 11003382 | 1/1999 |
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Cameron, Kim et al; "Design Rationale behind the Identity Metasystem Architecture"; http://www.identityblog.com/, http://research.microsoft.com/~mbj; Mar. 16, 2006, pp. 1-11.

Hoang et al.; "Secure Roaming with Identity Metasystems"; ACM 978-1-60558-006-1; http://portal.acm.org/citation.cfm?id=1373297; 2008, pp. 36-47.

"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-sts-rp-sts-a-sts-the- other-face-of-token-issuing.aspx+microsoft+age+STS+RP&hl=en&ct=clnk&cd=2&gl=us&client=firefox-a; MSDN Blogs; 2007, pp. 1-7.

"Identity Selector Interoperability Profile specification and companion guides"; Microsoft Download Center; http://www.microsoft.com/downloads/details.aspx?DisplayLang=en&FamilyID=b94817fc-3991-4ddO-8e85-b73e626f6764; Microsoft Corporation; 2007.

Nanda, Arun; Identity Selector Interoperability Profile V1.0 ; Microsoft Download Center, http://download.microsoft.com/download/1/1/a/11 ac6505-e4cO-4e05-987c-6f1 d31855cd2/1dentity-Selector-Interop-Profile-v1 .pdf; Microsoft Corporation; Apr. 2007, pp. 1-52.

Microsoft Corporation, Ping Identity Corporation, "An Implementer's Guide to the Identity Selector Interoperability Profile V1.0"; Microsoft Download Center, http://download.microsoft.com/download/1/1/a/11a6505-e4cO-4e05-987c-6f1d31855cd2/Identity-Selector-Interop-Profile-v1-Guide.pdf; Microsoft Corporation; Apr. 2007, pp. 1-74.

Jones, Michael B.; "A Guide to Using the Identity Selector Interoperability Profile V1.0 within Web Applications and Browsers"; Microsoft Download Center; http://download.microsoft.com/download/1/1/a/11ac6505-e4cO-4e05-987c-6f1 d31855cd2/Identity-Selector-Interop-Profile-v1-Web-Guide.pdf; Microsoft Corporation; Apr. 2007, pp. 1-14.

Jones, Michael B., "Michael B. Jones Homepage"; http://research/microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5,2005; Chapter 8, pp. 147-160.

"PwdHash From Stanford—Generate Passwords by Hashing the URL"; Don't Learn to Hack—Hack to Learn, http://www.darknet.org.uk/2007/03/pwdhash-from-stanford-generate; Darknet; Mar. 13, 2007, pp. 1-8.

"Microsoft's Vision for an Identity Metasystem"; http://www.identityblog.com/stories/2005/07/05/IdentityMetasystem.htm; Microsoft Corporation; May 2005, pp. 1-10.

Gnucitizen, "Attacking Password Recovery Facilities"; http://www/gnucitizen.org/blog/attacking-password-recovery-facilities; Jul. 6, 14 2007, pp. 1-4.

Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 26, 2009, XP002517143.

Harjanto, A., "InfoCard and Browser Integration", Internet Article, http://blogs.msdn.com/andyhar/archive/2006/02/20/535333.aspx>, Feb. 20, 2006, XP002517147.

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://www.techtree.com/techtree/jsp/article.jsp?print=1&article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, XP002517145.

Cameron, K., "Bill Gates, Inforcards and the Identity Metasystem", Internet Article, http://www.identityblog.com/?p=374>, Feb. 19, 2006, XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

Allan, A. (2003), "Best Practices for Managing Passwords: Self-Service Q&A". Published by Garner, Inc. at Tutorials, TU-20-2040, pp. 1-5.

Microsoft Corporation, Ping Identity Corporation (Aug. 25 2005), "A Guide to Integrating with InfoCard v1.0", XP007908505, pp. 1-62.

David Chappell, "Introducing Windows CardSpace", Windows Vista Technical Articles, http://msdn2.microsoft.com/en-us/library/aa480189(d=printer).aspx, Apr. 2006, pp. 1-13.

The Higgins Foundation, Higgins FAQ38 , http://www.eclipse.org/higgins/faq.php, printed Aug. 13, 2007, pp. 1-2.

"Components—Eclipsepedia", http://wiki.eclipse.org/Components, printed Aug. 13, 2007, pp. 1-8.

"Architecture—Eclipsepedia", http://wiki.eclipse.org/index.php/Architecture, printed Aug. 13, 2007, pp. 1-2.

U.S. Appl. No. 11/395,725, filed Mar. 31, 2006, entitled "Methods and Systems for Multi-Factor Authentication". This is a commonly owned application that is in the same general field as the invention.

Gralla, Preston; "How the Internet Works"; Millennium Ed. Que, Aug. 1999.

Microsoft Corporation, "Microsofts Vision for an Identity Metasystem" http://msdn.microsoft.com/en-us/library/ms996422.aspx, May 2005, pp. 1-7.

Nagarkar, V., "How to Drag Drop in javascript (Part 1)", Internet Article, http://www.codeproject.com/Kb/scripting/DragDrip_Part_1_.aspx, Jun. 11, 2006 (12 pages).

Waleed et al., "Addressing privacy issues in CardSpace", 2007, IEEE, pp. 285-291.

Jones, Michael B.; A Guide to Supporting Information Cards within Web Applications and Browers as of the Information Card Profile V1.0; Microsoft Download Center; http://msdn.microsoft.com/en-us/library/aa480726.aspx; Dec. 2006, pp. 1-13.

WHTE, How Computers Work, Millennium Edition, 1999, Que Corporation.

Gevers et al., Enhancing Privacy in Identity Management Systems, WPES '07, ACM, Oct. 2007 (4 pages).

* cited by examiner

CHAINING INFORMATION CARD SELECTORS

RELATED APPLICATION DATA

This patent application claims the benefit of U.S. Provisional Patent Application Ser. No. 60/895,312, filed Mar. 16, 2007, of U.S. Provisional Patent Application Ser. No. 60/895,316, filed Mar. 16, 2007, and U.S. Provisional Patent Application Ser. No. 60/895,325, filed Mar. 16, 2007, all of which are incorporated by reference herein for all purposes. This patent application is related to co-pending U.S. patent application Ser. No. 11/843,572, filed Aug. 22, 2007, to co-pending U.S. patent application Ser. No. 11/843,638, filed Aug. 22, 2007, and to co-pending U.S. patent application Ser. No. 11/843,640, filed Aug. 22, 2007, all of which are incorporated by reference herein for all purposes.

FIELD OF THE INVENTION

This invention pertains to performing on-line transactions, and more particularly to supporting multiple card selectors used in performing on-line transactions.

BACKGROUND OF THE INVENTION

When a user interacts with sites on the Internet (hereafter referred to as "service providers" or "relying parties"), the service provider often expects to know something about the user that is requesting the services of the provider. The typical approach for a service provider is to require the user to log into or authenticate to the service provider's computer system. But this approach, while satisfactory for the service provider, is less than ideal to the user. First, the user must remember a username and password for each service provider who expects such information. Given that different computer systems impose different requirements, and the possibility that another user might have chosen the same username, the user might be unable to use the same username/password combination on each such computer system. (There is also the related problem that if the user uses the same username/password combination on multiple computer systems, someone who hacks one such computer system would be able to access other such computer systems.) Second, the user has no control over how the service provider uses the information it stores. If the service provider uses the stored information in a way the user does not want, the user has relatively little ability to prevent such abuse, or recourse after the fact.

To address this problem, new systems have been developed that allow the user a measure of control over the information stored about the user. Windows CardSpace™ (sometimes called CardSpace) is a Microsoft implementation of an identity meta-system that offers a solution to this problem. (Microsoft, Windows, and CardSpace are either registered trademarks or trademarks of Microsoft Corporation in the United States and/or other countries.) A user can store identity information with an identity provider the user trusts. When a service provider wants some information about the user, the user can control the release of information stored with the identity provider to the service provider. The user can then use the offered services that required the identity information.

Systems such as Microsoft Windows CardSpace do not establish a single way to manage the information cards. This "lack" of a "standard" is actually a good thing, in that parties that develop card selectors are not limited to a single defined mechanism for storing and using information cards. If a developer decides that a particular piece of data is important to store with an information card, there is no "standard" that prohibits the developer from adding that data to the information card. But it creates a problem in that information cards created by different systems might not be compatible with card managers of other developers.

Information card management tools typically offer the ability to export and import information cards. By exporting and importing cards, users can, if they choose, consolidate their information cards in a single card store that uses a common structure. But such import and export functions can result in the loss of data in the information card. For example, if it turns out that one information card management system stores a particular piece of data that is used only by the card selector developed by that same developer, exporting and importing the information card into a new card management system can result in the loss of that piece of data and the corresponding functionality.

A need remains for a way to provide users with the ability to manage their information cards without losing functionality that addresses these and other problems associated with the prior art.

SUMMARY OF THE INVENTION

In an embodiment of the invention, a machine stores information cards in a plurality of card stores, each of which is associated with a card selector. When the machine is used to perform an on-line transaction, a generic card selector is invoked. The generic card selector uses a selector policy engine to select an appropriate card selector to be used in the transaction. The selector policy engine can indicate that the user should be prompted to select a card selector. An information card can then be identified and used in performing the on-line transaction.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
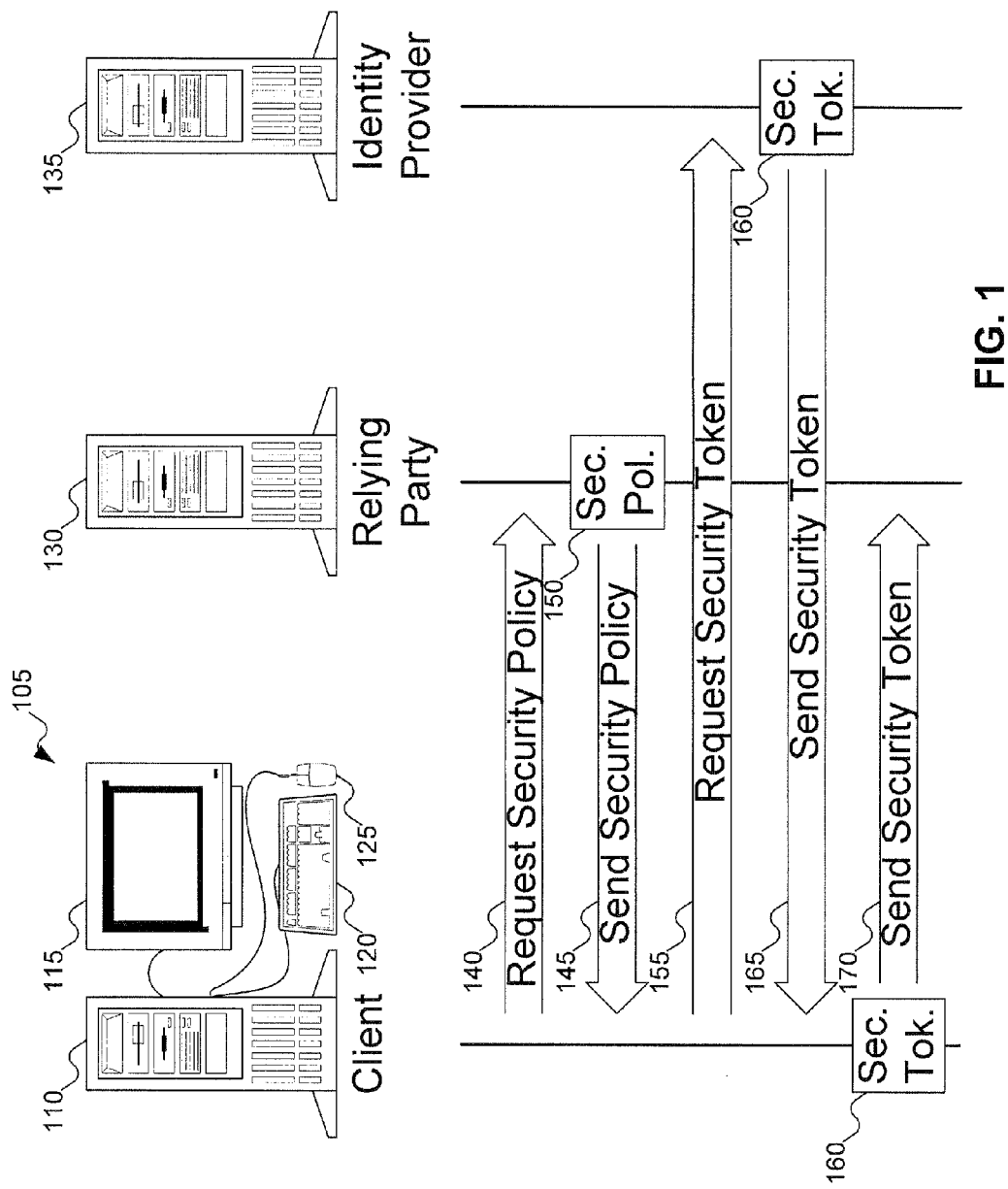
FIG. 1 shows a sequence of communications between a client, a relying party, and an identity provider.

Before explaining the invention, it is important to understand the context of the invention. FIG. 1 shows a sequence of communications between a client, a relying party, and an identity provider. For simplicity, each party (the client, the relying party, and the identity provider) may be referred to by their machines. Actions attributed to each party are taken by that party's machine, except where the context indicates the actions are taken by the actual party.

In FIG. 1, computer system 105, the client, is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105; for example, a central processing unit, memory, storage, etc. Although not shown in FIG. 1, a person skilled in the art will recognize that computer system 105 can interact with other computer systems, such as relying party 130 and identity provider 135, either directly or over a network (not shown) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Relying party 130 is a machine managed by a party that relies in some way on the identity of the user of computer system 105. The operator of relying party 130 can be any type of relying party. For example, the operator of relying party 130 can be a merchant running a business on a website. Or, the operator of relying party 130 can be an entity that offers assistance on some matter to registered parties. Relying party 130 is so named because it relies on establishing some identifying information about the user.

Identity provider 135, on the other hand, is managed by a party responsible for providing identity information (or other such information) about the user for consumption by the relying party. Depending on the type of information identity provider 135 stores for a user, a single user might store identifying information with a number of different identity providers 135, any of which might be able to satisfy the request of the relying party. For example, identity provider 135 might be a governmental agency, responsible for storing information generated by the government, such as a driver's license number or a social security number. Or, identity provider 135 might be a third party that is in the business of managing identity information on behalf of users.

The conventional methodology of releasing identity information can be found in a number of sources. One such source is Microsoft Corporation, which has published a document entitled Introducing Windows CardSpace, which can be found on the World Wide Web and is hereby incorporated by reference. To summarize the operation of Windows CardSpace, when a user wants to access some data from relying party 130, computer system 105 requests the security policy of relying party 130, as shown in communication 140, which is returned in communication 145 as security policy 150. Security policy 150 is a summary of the information relying party 130 needs, how the information should be formatted, and so on.

Once computer system 105 has security policy 150, computer system 105 can identify which information cards will satisfy security policy 150. Different security policies might result in different information cards being usable. For example, if relying party 130 simply needs a username and password combination, the information cards that will satisfy this security policy will be different from the information cards that satisfy a security policy requesting the user's full name, mailing address, and social security number. The user can then select an information card that satisfies security policy 150.

Once the user has selected an acceptable information card, computer system 105 uses the selected information card to transmit a request for a security token from identity provider 135, as shown in communication 155. This request can identify the data to be included in the security token, the credential that identifies the user, and other data the identity provider needs to generate the security token. Identity provider 135 returns security token 160, as shown in communication 165. Security token 160 includes a number of claims or pieces of information, that include the data the user wants to release to the relying party. Security token 160 is usually encrypted in some manner, and perhaps signed and/or time-stamped by identity provider 135, so that relying party 130 can be certain that the security token originated with identity provider 135 (as opposed to being spoofed by someone intent on defrauding relying party 130). Computer system 105 then forwards security token 160 to relying party 130, as shown in communication 170.

In addition, the selected information card can be a self-issued information card: that is, an information card issued not by an identity provider, but by computer system 105 itself. In that case, identity provider 135 effectively becomes part of computer system 105.

In this model, a person skilled in the art will recognize that because all information flows through computer system 105, the user has a measure of control over the release of the user's identity information. Relying party 130 only receives the information the user wants relying party 130 to have, and does not store that information on behalf of the user (although it would be possible for relying party 130 to store the information in security token 160: there is no effective way to prevent such an act).

The above description does not touch on the possibility that there might be more than one card selector. Put another way, the above description, which is how the system is generally envisioned as operating, does not address the consideration that there might be multiple different platforms, each of which could use one or more different card providers. This is the problem that embodiments of this invention address.

Figure 2:
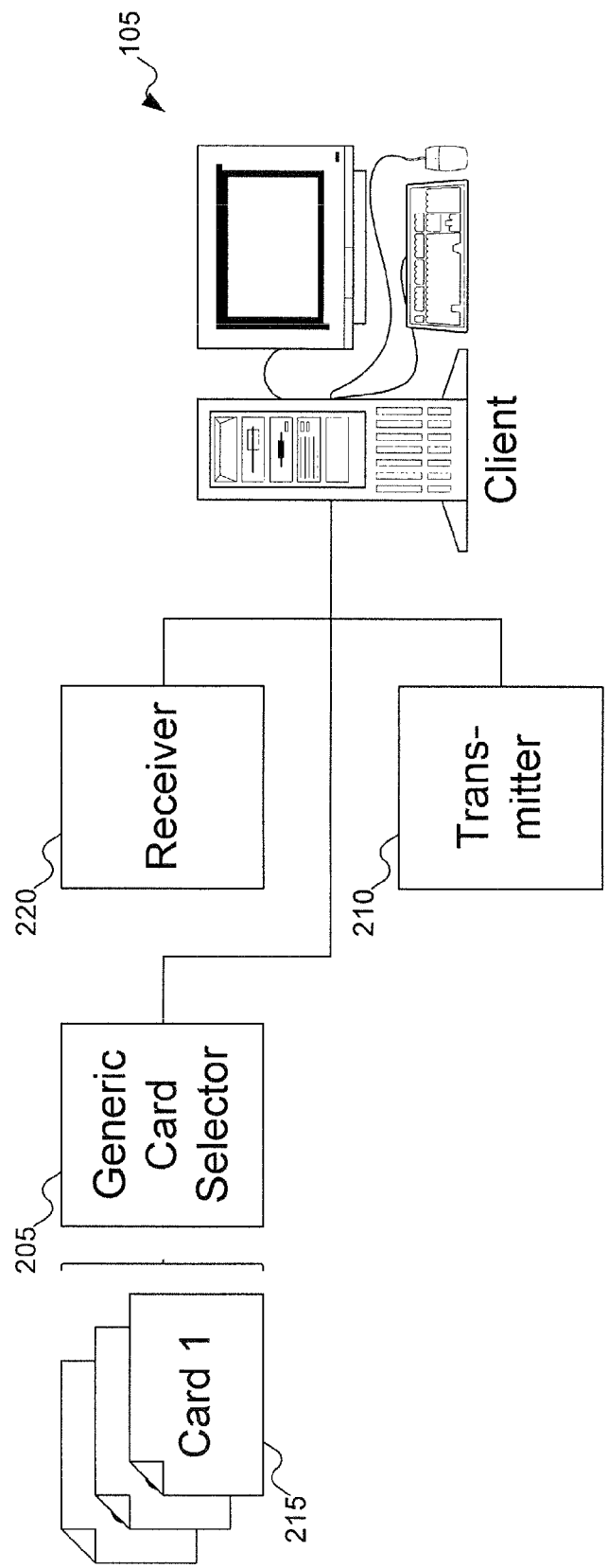
FIG. 2 shows a system designed to provide the ability to manage information cards, according to an embodiment of the invention.

Now that the problem—finding a way to permit different card stores that communicate with different card providers—is understood, a solution to the problem can be described. FIG. 2 shows a system to perform a transaction without storing information card information on computer system 105, according to an embodiment of the invention. In FIG. 2, computer system 105 includes generic card selector 205, receiver 210, and transmitter 215. Generic card selector 205 is responsible for enabling a user to select information card 220 that satisfies the security policy, but might not be able to interface with every card store on computer system 105. Receiver 210 is responsible for receiving data transmitted to computer system 105, and transmitter 215 is responsible for transmitting information from computer system 105. These components are the same as those found in computer system 105 as shown in FIG. 1.

Figure 3:
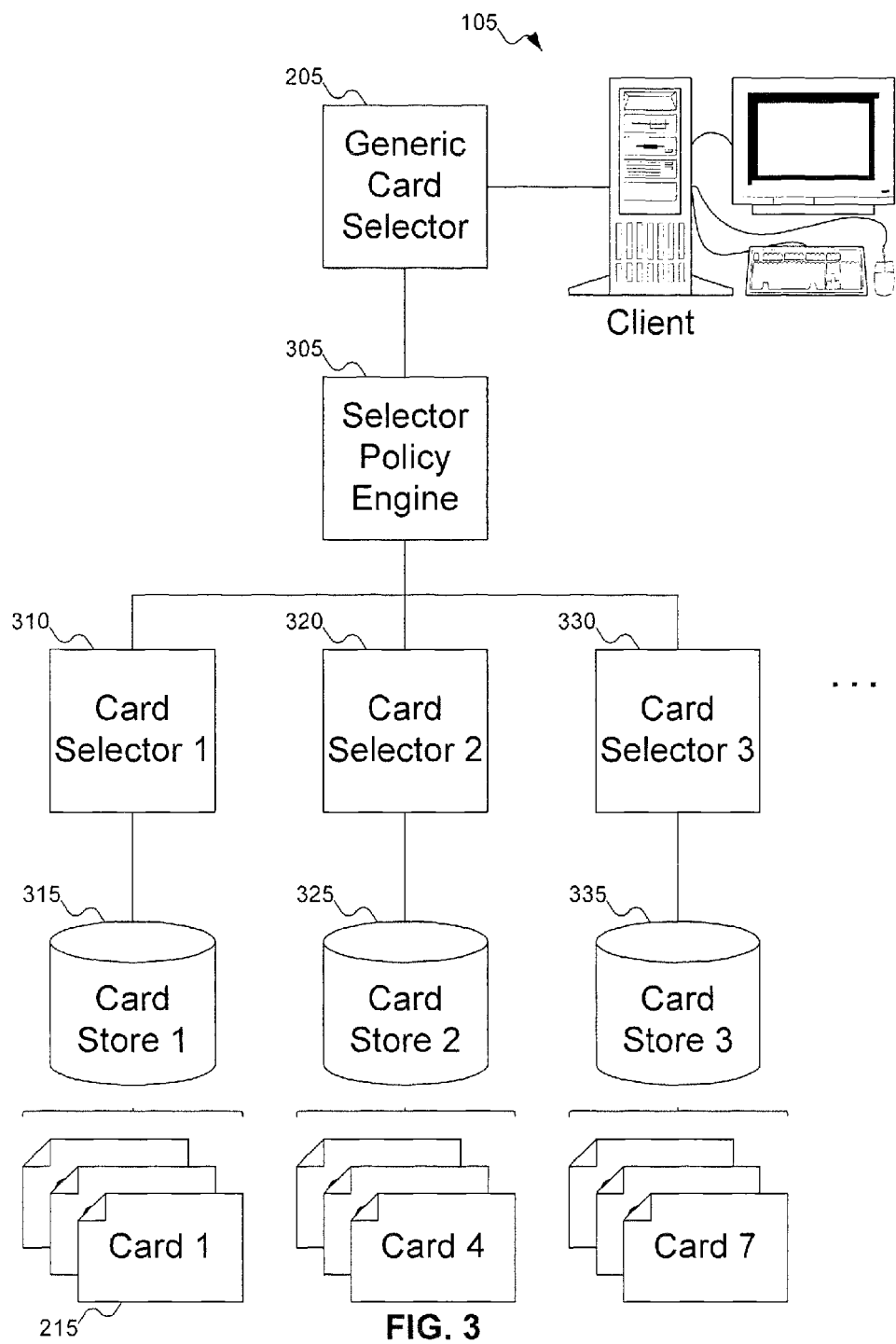
FIG. 3 shows details about interactions between the generic card selector and other card selectors and information cards in the system of FIG. 2.

FIG. 3 shows details about interactions between the generic card selector and other card selectors and information cards in the system of FIG. 2. In FIG. 3, generic card selector 205 uses selector policy engine 305 to select a card selector that can be used to interface with one or more card stores. For example, in FIG. 3, card selector 310 is shown as interfacing with card store 315, which can include information card 215; card selector 320 is shown as interfacing with card store 325; and card selector 330 is shown as interfacing with card store 335. While FIG. 3 shows three card selectors, each interfacing with one card store, a person skilled in the art will recognize that there can be any number of card selectors, each of which can interface with any number of card stores. Further, it can occur that multiple card selectors can interface with a single card store.

Figure 4:
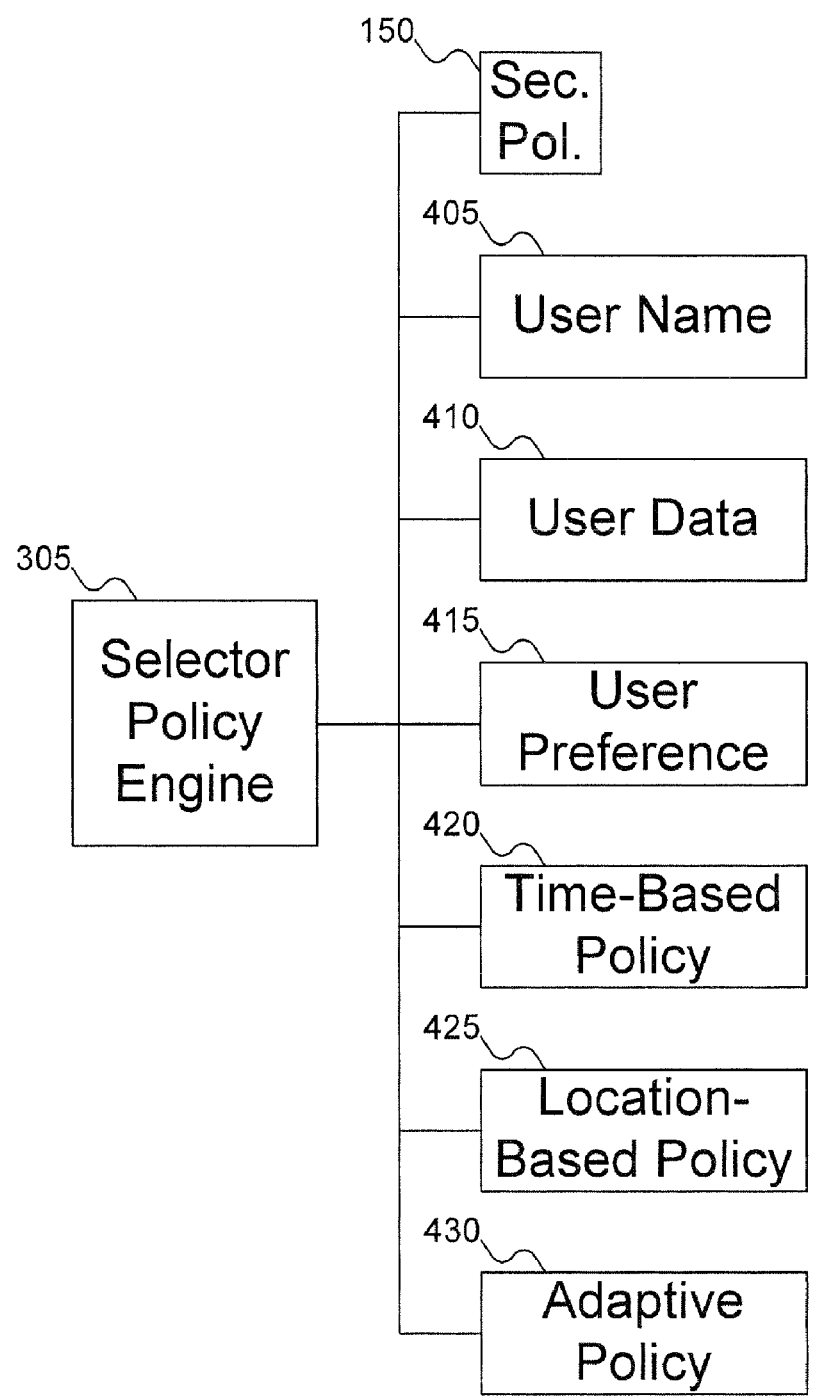
FIG. 4 shows examples of types of data that can be used by the selector policy engine of FIG. 3 in selecting a card selector.

Selector policy engine 305 uses policies to select the appropriate card store. Any desired policies can be used. FIG. 4 shows examples of policies that can be used to select a card selector. In FIG. 4, among the various data that can be used to select the card selector are: security policy 160 received from the relying party; user name (or login ID) 405; other user data 410, which can be any other data about the user: for example, the department in which the user works; and user preference 415 (for example, the user might indicate that when providing information to a particular relying party to use a particular card selector). In addition, the policy used to select a card selector can be time-based policy 420 or location-based policy 425, in which case the time when and/or location where the policy is used can be a factor in selecting the card selector. For example, during work hours, selector policy engine 305 might select one card selector, but outside of working hours, selector policy engine 305 might select a different card selector. Or when selector policy engine 305 can select different card selectors based on whether the computer on which the user is performing the transaction is at work or at home. Finally, selector policy engine 305 can use adaptive policy 430. Adaptive policy 430 is a policy that changes over time: the rules governing its operation are not constant. For example, an adaptive policy might learn to identify patterns in the user's choice of card selectors and adjust itself accordingly to try and anticipate the user's pattern. A person skilled in the art will also recognize that any other policy can be used to select the card selector.

When selector policy engine 305 receives a policy, the selection of the card selector can be performed automatically. Selector policy engine 305 can also indicate that the user should be prompted to select a card selector. In that case, the user is given the option of selecting the card selector to use for the transaction. A person skilled in the art will also recognize that even if selector policy engine 305 automatically selects a card selector based on one or more policies, the user can manually override that choice; and choose a different card selector.

Figure 5:
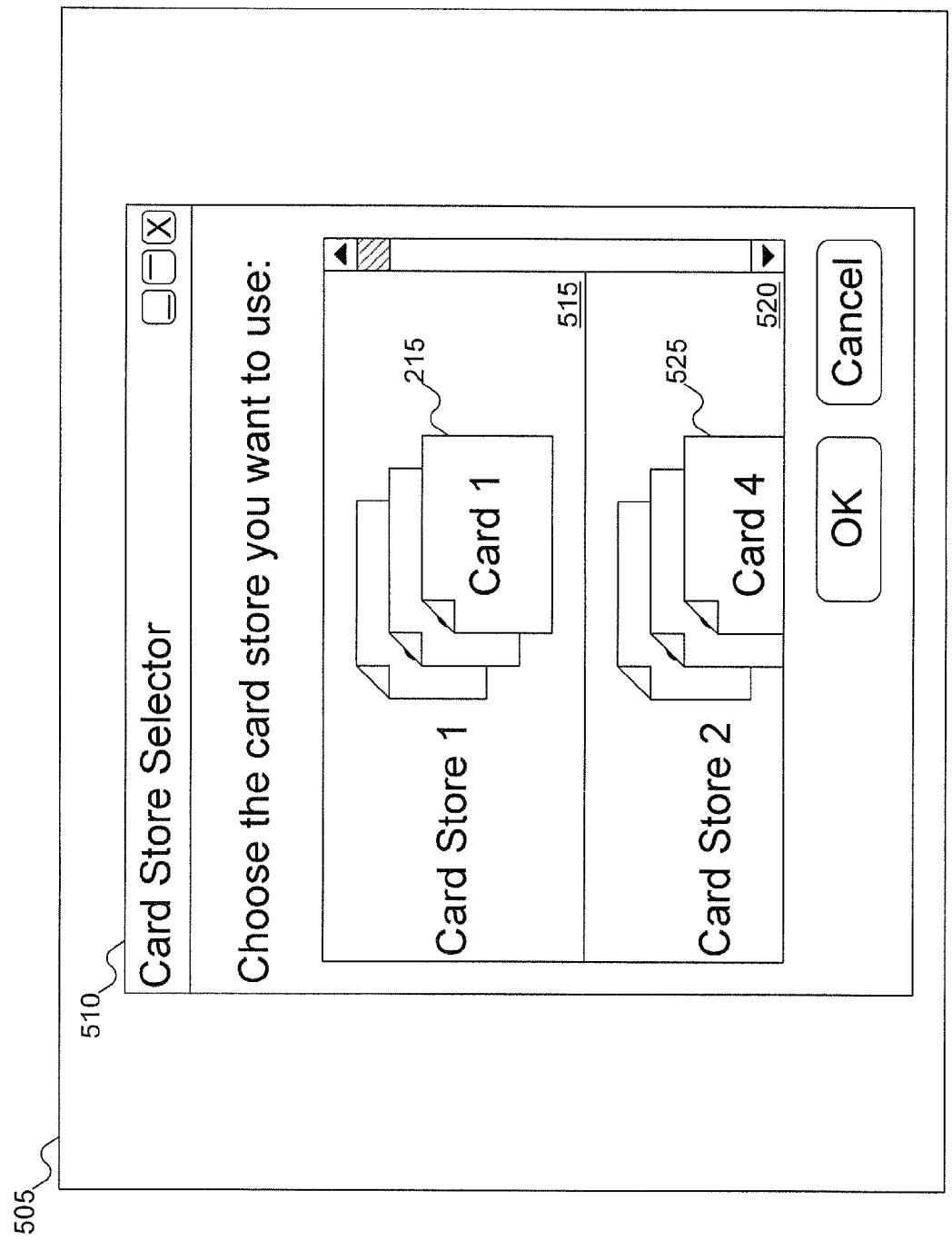
FIG. 5 shows an example screenshot presented to a user in selecting a card selector in the system of FIG. 2.

FIG. 5 shows an example screenshot presented to a user in selecting a card selector in the system of FIG. 2. In FIG. 5, screen 505 is shown with pop-up window 510 giving the user the opportunity to select a card selector. The user might see pop-up window 510 because the selector policy engine indicated that the user was supposed to manually select the card selector. Or it might be that the selector policy engine had automatically selected a card selector, but the user overrode that selection, and so was presented with pop-up window 510.

Regardless of the sequence that led to screenshot of FIG. 5, pop-up window 510 offers the user at least two card selectors 515 and 520 (there might be more card selector options found by scrolling down pop-up window 510). For each card selector, pop-up window can provide information about the card selector, such as the cards managed by that card selector. For example, in card selector 515, information card 215 is available, whereas in card selector 520, information card 525 is available. Once the user has selected the desired card selector, the user can then select an information card using that card selector, and complete the transaction.

Figure 6:
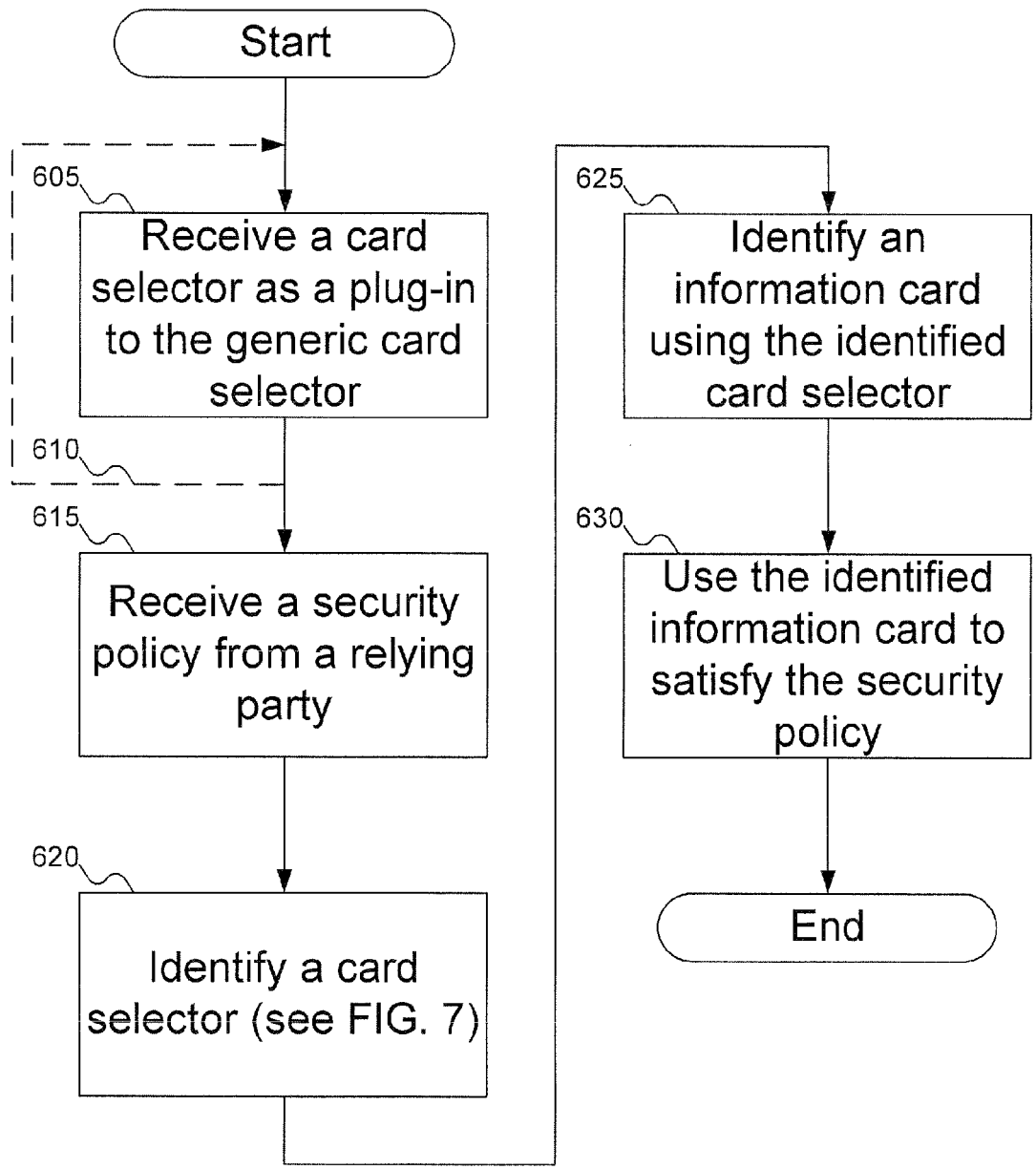
FIG. 6 shows a flowchart of a procedure for using multiple card selectors to manage information cards in the system of FIG. 2.

FIG. 6 shows a flowchart of a procedure for using multiple card selectors to manage information cards in the system of FIG. 2. At block 605, the machine receives a card selector as a plug-in to the generic card selector. This can occur for multiple different card selectors: as shown by dashed arrow 610, block 605 can be performed any number of times as appropriate. A person skilled in the will also recognize that block 605 can be performed at any time, usually when a card store is made available on the machine. At block 615, the machine receives a security policy from the relying party. At block 620, the generic card selector uses the selector policy engine to select a card selector, as described below with reference to FIG. 7. At block 625, an information card is identified using the card selector. Finally, at block 630, the machine uses the identified information card to satisfy the security policy. As described above, this typically involves requesting a security token from an identity provider, and transmitting the security token to the relying party.

Although FIG. 6 describes adding card selectors to the machine, FIG. 6 does not describe removing card selectors. Typically, card selectors will remain on the machine as long as the associated card stores are on the machine. But a person skilled in the art will recognize that card selectors can also be removed from the machine, if they do not interface with any card stores on the machine.

Figure 7:
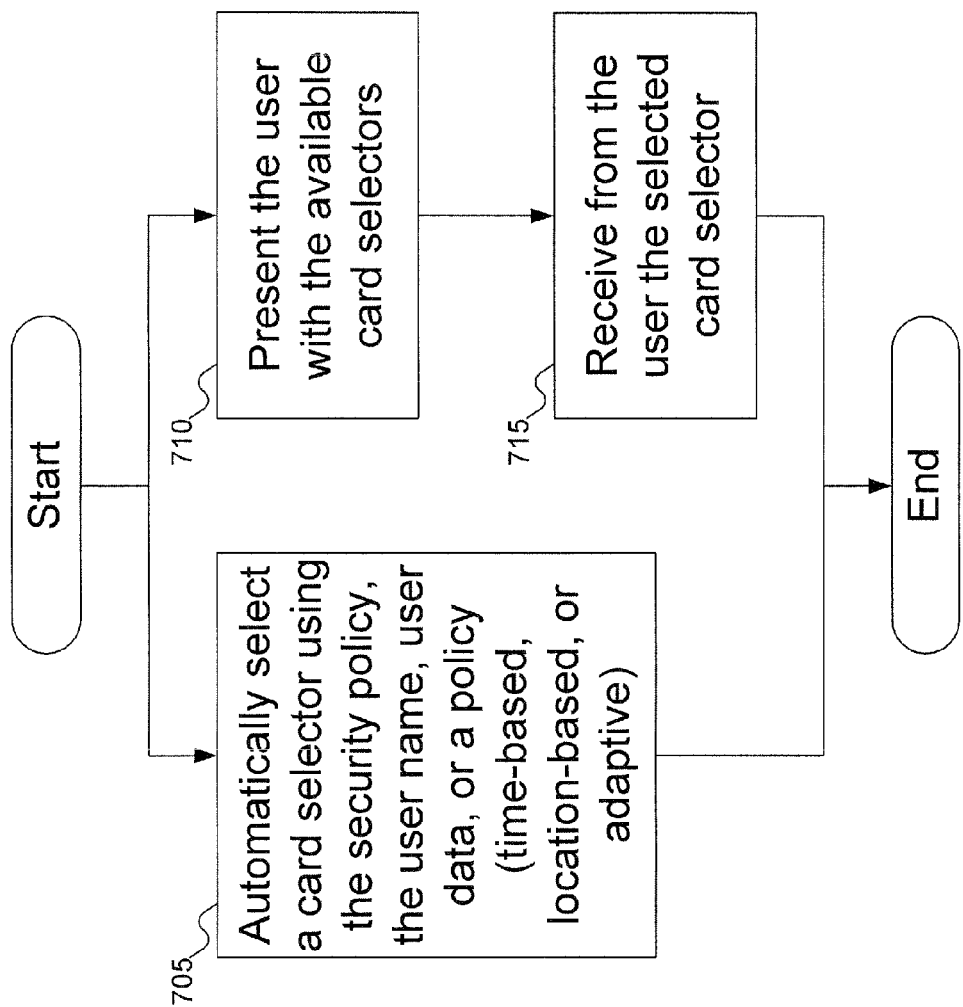
FIG. 7 shows a flowchart of different procedures for selecting a card selector in the system of FIG. 2.

FIG. 7 shows a flowchart of different procedures for selecting a card selector in the system of FIG. 2. At block 705, the selector policy engine can automatically select a card selector using one or more policies, as described above with reference to FIGS. 3-4. Alternatively, at block 710, the machine can present to the user a list of all available card selectors, and at block 715 the machine can receive from the user the preferred card selector.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention may be described by reference to or in conjunction with associated data including functions, procedures, data structures, application programs, instructions, etc.

which, when accessed by a machine, result in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
   a computer (105);
   a plurality of card selectors (310, 320, 330), each card selector (310, 320, 330) associated with at least one card store (315, 325, 335);
   a generic card selector (205) to receive a security policy (150);
   a selector policy engine (305) to identify one of the plurality of card selectors (310, 320, 330); and
   means for using one of the information cards (215) in a card store (315, 325, 335) associated with said identified card selector (310, 320, 330) to respond to the security policy (150).

2. An apparatus according to claim 1, wherein the selector policy engine (305) is operative to present to a user the list (510) of plurality of card selectors (310, 320, 330) and receive from the user an identification of said identified card selector (310, 320, 330).

3. An apparatus according to claim 1, wherein the selector policy engine (305) is operative to identify said one of the plurality of card selectors (310, 320, 330) based on at least one of a set including the security policy (150), a user name (405), a user data (410), a user preference (415) for the card store (315, 325, 335), and a policy (420, 425, 430).

4. An apparatus according to claim 3, wherein the policy (420, 425, 430) is any of a time-based policy (420), a location-based policy (425), or an adaptive policy (430).

5. An apparatus according to claim 1, wherein each card store (315, 325, 335) is compatible with only its associated card selector (310, 320, 330).

6. An apparatus according to claim 1, wherein the generic card selector (205) includes a plug-in receiver to add the identified card selector (310, 320, 330) to the plurality of card selectors (310, 320, 330).

7. A method for performing a transaction using a generic card selector (205), comprising:
   receiving (615) a security policy (150) from a relying party;
   identifying (620) a card selector (310, 320, 330) from a plurality of card selectors (310, 320, 330), each card selector (310, 320, 330) associated with at least one card store (315, 325, 335);
   using (625) the identified card selector (310, 320, 330) to identify an information card (215) in the associated card store (315, 325, 335); and
   using (630) the information card (215) to satisfy the security policy (150).

8. A method according to claim 7, wherein identifying (620) a card selector (310, 320, 330) includes receiving (715) from a user a selection of the card selector (310, 320, 330) from the plurality of card selectors (310, 320, 330).

9. A method according to claim 8, wherein receiving (715) from a user a selection of the card selector (310, 320, 330) includes presenting (710) to the user a list (510) of the plurality of card selectors (310, 320, 330).

10. A method according to claim 7, wherein identifying a card selector (310, 320, 330) includes automatically selecting (705) a card selector (310, 320, 330) based on at least one of a set including the security policy (150), a user name (405), a user data (410), a user preference (415) for the card store (315, 325, 335), and a policy (420, 425, 430).

11. A method according to claim 7, wherein automatically selecting (705) a card selector (310, 320, 330) includes automatically selecting (705) a card selector (310, 320, 330) based on any of a time-based policy (420), a location-based policy (425), or an adaptive policy (430).

12. A method according to claim 7, wherein identifying (620) a card selector (310, 320, 330) from a plurality of card selectors (310, 320, 330) includes identifying (620) the card selector (310, 320, 330) from the plurality of card selectors (310, 320, 330), each card selector (310, 320, 330) associated with at least one card store (315, 325, 335), and each card store (315, 325, 335) compatible only with the associated card selector (310, 320, 330).

13. A method according to claim 7, further comprising receiving (605) the card selector (310, 320, 330) as a plug-in to the generic card selector (205).

14. An article, comprising a non-transitory storage medium, said non-transitory storage medium having stored thereon instructions that, when executed by a machine, result in:
   receiving (615) a security policy (150) from a relying party;
   identifying (620) a card selector (310, 320, 330) from a plurality of card selectors (310, 320, 330), each card selector (310, 320, 330) associated with at least one card store (315, 325, 335);
   using (625) the identified card selector (310, 320, 330) to identify an information card (215) in the associated card store (315, 325, 335); and
   using (630) the information card (215) to satisfy the security policy (150).

15. An article according to claim 14, wherein identifying (620) a card selector (310, 320, 330) includes receiving (715) from a user a selection of the card selector (310, 320, 330) from the plurality of card selectors (310, 320, 330).

16. An article according to claim 15, wherein receiving (715) from a user a selection of the card selector (310, 320, 330) includes presenting (710) to the user a list (510) of the plurality of card selectors (310, 320, 330).

17. An article according to claim 14, wherein identifying a card selector (310, 320, 330) includes automatically selecting (705) a card selector (310, 320, 330) based on at least one of a set including the security policy (150), a user name (405), a user data (410), a user preference (415) for the card store (315, 325, 335), and a policy (420, 425, 430).

18. An article according to claim 14, wherein automatically selecting (705) a card selector (310, 320, 330) includes automatically selecting (705) a card selector (310, 320, 330) based on any of a time-based policy (420), a location-based policy (425), or an adaptive policy (430).

19. An article according to claim 14, wherein identifying (620) a card selector (310, 320, 330) from a plurality of card selectors (310, 320, 330) includes identifying (620) the card selector (310, 320, 330) from the plurality of card selectors (310, 320, 330), each card selector (310, 320, 330) associated with at least one card store (315, 325, 335), and each card store (315, 325, 335) compatible only with the associated card selector (310, 320, 330).

20. An article according to claim 14, wherein said non-transitory storage medium has stored thereon further instructions that, when executed by said machine, result in receiving (605) the card selector (310, 320, 330) as a plug-in to the generic card selector (205).

\* \* \* \* \*